United States Patent [19]

Mizuta

[11] 4,367,029
[45] Jan. 4, 1983

[54] METHOD AND APPARATUS FOR AUTOMATICALLY CONTROLLING AN ACTIVITY OF A DEVELOPING LIQUID FOR USE IN A DEVELOPER

[75] Inventor: Masaji Mizuta, Uji, Japan

[73] Assignee: Dainippon Screen Seizo Kabushiki Kaisha, Kyoto, Japan

[21] Appl. No.: 325,388

[22] Filed: Nov. 27, 1981

[30] Foreign Application Priority Data

Dec. 16, 1980 [JP] Japan .................................. 55-176611

[51] Int. Cl.³ ........................ G03D 3/02; G03D 13/00
[52] U.S. Cl. .................................... 354/298; 354/324; 137/624.15; 250/559
[58] Field of Search ........................ 354/297, 298, 324; 137/93, 624.15; 222/638, 644; 250/559, 570, 571, 573; 356/443, 444

[56] References Cited

U.S. PATENT DOCUMENTS 4,104,670  8/1978  Charnley et al. .................... 354/324
4,128,325 12/1975  Melander et al. .................... 354/298

Primary Examiner—William B. Perkey
Attorney, Agent, or Firm—Zarley, McKee, Thomte, Voorhees & Sease

[57] ABSTRACT

A method and apparatus for automatically controlling an activity of a developing liquid for use in a developer are disclosed. A blackening area rate detector detects a blackening area rate of a film developed and outputs an analog signal to a voltage-frequency converter which converts it into a digital signal. The digital signal is sent to a dividing counter which frequency-divides it and outputs a supplement signal to an up-down counter. The up-down counter is counted up by the supplement signal to output a high level signal to a timer via a gate. The timer is actuated by the high level signal to actuate a valve so as to supply a supplemental developing liquid to a developing tank. The gate is closed by using the output signal of the timer during the actuation of the timer. The up-down counter is counted down by the high level signal passed through the gate.

4 Claims, 1 Drawing Figure

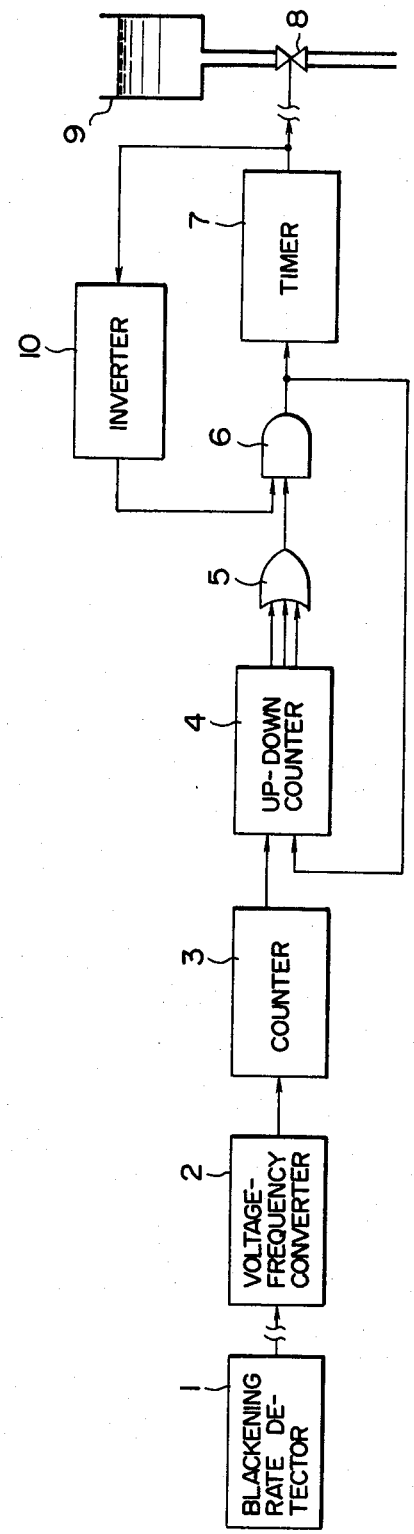

METHOD AND APPARATUS FOR AUTOMATICALLY CONTROLLING AN ACTIVITY OF A DEVELOPING LIQUID FOR USE IN A DEVELOPER

BACKGROUND OF THE INVENTION

The present invention relates to a method and apparatus for automatically controlling an activity of a developing liquid, for use in a developer.

In a conventional automatic developer, an apparatus for automatically controlling an activity of a developing liquid supplies a supplemental developing liquid of the corresponding amount to the blackening area of a photographic printing paper, film, or the like, developed after the start of the operation. In this embodiment, the concentration of the supplemental developing liquid, its supplying volume by one operation, and the one supplementing time are fixed, and this supplement is started by a supplement signal so as to control the interval of every supplement when the blackening area of the film becomes a fixed value, thereby controlling the activity of the developing liquid in a certain range.

Hence, when films having a large blackening area are processed continuously, the blackening area is raised to the fixed value to output the supplement signal in a short time. However, when the supplement signal is output during the supplement of the supplemental developing liquid, this signal is ignored and becomes ineffective, with the result of the depression of the activity under the standard value.

When the concentrated supplemental developing liquid is supplied rapidly in order to avoid such a problem, the activity of the developing liquid becomes uneven, and the volume of every supplement becomes incorrect.

SUMMARY OF THE INVENTION

It is an object of the present invention to provide a method for automatically controlling an activity of a developing liquid, for use in a developer, free from the aforementioned defects, which is simple, stable and reliable.

It is another object of the present invention to provide an apparatus for automatically controlling an activity of a developing liquid, for use in a developer, free from the aforementioned defects, which is simple, stable and reliable.

According to the present invention there is provided a method for automatically controlling an activity of a developing liquid, for use in a developer, comprising the steps of (a) detecting a blackening area rate of a film developed by a blackening area rate detector to obtain an analog signal, (b) converting the analog signal into a digital signal by a voltage-frequency converter, (c) frequency-dividing the digital signal by a dividing counter to obtain a supplement signal, (d) counting up an up-down counter by the supplement signal to output a high level signal from the up-down counter counted up, (e) sending the high level signal to a timer via a gate to actuate the timer, and (f) actuating a valve by an output signal of the timer so as to supply a supplemental developing liquid to a developing tank, wherein the gate is closed by using the output signal of the timer during the actuation of the timer, and wherein the up-down counter is counted down by the high level signal through the gate.

According to the present invention there is also provided an apparatus for automatically controlling an activity of a developing liquid, for use in a developer, comprising (a) a blackening area rate detector which detects a blackening area rate of a film developed and outputs an analog signal, (b) a voltage-frequency converter which converts the analog signal into a digital signal, (c) a dividing counter which frequency-divides the digital signal to output a supplement signal, (d) an up-down counter which is counted up by the supplement signal to output a high level signal, (e) a gate which passes or stops the high level signal, (f) a timer which is actuated by the high level signal to output a high level signal, and (g) a valve which is actuated by the high level signal of the timer so as to supply a supplemental developing liquid to a developing tank, wherein the gate is closed by using the output signal of the timer during the actuation of the timer, and wherein the up-down counter is counted down by the high level signal through the gate.

BRIEF DESCRIPTION OF DRAWING

In order that the present invention may be better understood, a preferred embodiment thereof will be described with reference to the accompanying drawing, in which:

The FIGURE is a block diagram of an apparatus which performs a method according to the present invention.

DESCRIPTION OF THE PREFERRED EMBODIMENT

Referring to the drawing there is shown in the FIGURE an apparatus which carries out a method according to the present invention.

A film blackening area rate detector 1 of a conventional type comprises a light source, a photoelectric cell, an amplifier and a differential amplifier (not shown), and is positioned between a water washing tank and a drying tank of an automatic developer (not shown). It detects a blackening area rate of a film which is developed and washed by water to output a analog signal corresponding to the blackening area rate.

The analog signal of the film blackening area rate detector 1 is sent to a voltage-frequency converter 2, hereinafter referred to as a V/F converter, and is converted there into a pulse signal having a period corresponding to the blackening area rate. Then, the converted digital signal is frequency-divided by a dividing counter 3 by counting the converted digital signals. When the blackening area rate is come up to a certain value, the dividing counter 3 outputs a supplement signal as an up signal to an up-down counter 4.

Then, in the up-down counter 4, the number is counted up from zero to one by the supplement signal, and the up-down counter 4 outputs a high level signal. The up-down counter 4 is counted up one by one by the supplement signals, and outputs the high level signal when the count number is more than zero and a low level signal when the count number is zero.

The high level signal generated by the up-down counter 4 is fed to a timer 7 via an OR gate 5 and an AND gate 6. Then, the timer 7 outputs a high level signal for a predetermined period to a solenoid valve 8, and the solenoid valve 8 is opened by the high level signal so as to supply the supplemental developing liquid contained in a supplemental developing liquid tank 9 to the developing tank (not shown) at a certain speed for the predetermined period.

Meanwhile, the high level signal of the up-down counter 4 is also fed to itself as a down signal via the OR gate 5 and the AND gate 6, and the count number of the up-down counter 4 is counted down one by one by the high level signals generated by the up-down counter 4 until the count number becomes zero.

The high level signal generated by the timer 7 is sent to an inverter 10 wherein the high level signals is inverted to a low level signal. This low level signal is sent to the AND gate 6 and closes the AND gate 6 so as not to pass the high level signal sent from the up-down counter 4 therethrough.

Now, when the counter 3 sends the supplement signal or signals to the up-down counter 4 while the timer 7 is actuated, i.e. the solenoid valve 8 is opened to supply the supplemental developing liquid to the developing tank, the up-down counter 4 is counted up and continues to output the high level signal. However, the high level signal is stopped by the AND gate 6 because the low level signal sent from the inverter 10 is fed to the AND gate 6. In other words, the supplement signal or signals are held or reserved in the up-down counter 4 in such conditions.

Then, the predetermined period of time of the timer 7 lapses, and the timer 7 is deactivated and outputs a low level signal which is sent to the inverter 10. The inverter 10 inverts the low level signal to the high level signal. This inverted high level signal is fed to the AND gate 6 and opens the AND gate 6 so as to pass the high level signal sent from the up-down counter 4. The high level signal passed through the AND gate 6 is sent to the timer 7 as well as the up-down counter 4. Then, the timer 7 actuates the solenoid valve 8 to open it and the up-down counter 4 is counted down by one. This operation is repeated until the count number of the up-down counter 4 becomes zero.

It is readily understood from the above description, the activity of the developing liquid in the developing tank is maintained to the predetermined range even when the films having the large blackening area are continuously processed.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A method for automatically controlling an activity of a developing liquid, for use in a developer, comprising the steps of:
   (a) detecting a blackening area rate of a film developed by a blackening area rate detector to obtain an analog signal;
   (b) converting the analog signal into a digital signal by a voltage-frequency converter;
   (c) frequency-dividing the digital signal by a dividing counter to obtain a supplement signal;
   (d) counting up an up-down counter by the supplement signal to output a high level signal from the up-down counter counted up;
   (e) sending the high level signal to a timer via a gate to actuate the timer; and
   (f) actuating a valve by an output signal of the timer so as to supply a supplemental developing liquid to a developing tank, wherein the gate is closed by using the output signal of the timer during the actuation of the timer, and wherein the up-down counter is counted down by the high level signal through the gate.

2. A method as defined in claim 1, wherein the output signal of the timer is sent to an inverter which outputs an inverted signal to the gate, and wherein the gate is opened by the high level signal and is closed by the low level signal.

3. An apparatus for automatically controlling an activity of a developing liquid, for use in a developer, comprising:
   (a) a blackening area rate detector which detects a blackening area rate of a film developed and outputs an analog signal;
   (b) a voltage-frequency converter which converts the analog signal into a digital signal;
   (c) a dividing counter which frequency-divides the digital signal to output a supplement signal;
   (d) an up-down counter which is counted up by the supplement signal to output a high level signal;
   (e) a gate which passes or stops the high level signal;
   (f) a timer which is actuated by the high level signal to output a high level signal; and
   (g) a valve which is actuated by the high level signal of the timer so as to supply a supplemental developing liquid to a developing tank, wherein the gate is closed by using the output signal of the timer during the actuation of the timer, and wherein the up-down counter is counted down by the high level signal through the gate.

4. An apparatus as defined in claim 3, wherein the output signal of the timer is sent to an inverter which outputs an inverted signal to the gate, and wherein the gate is opened by the high level signal and is closed by the low level signal.

* * * * *